United States Patent [19]

Gut et al.

[11] 3,754,232

[45] Aug. 21, 1973

[54] CIRCUIT ARRANGEMENT FOR BASELINE COMPENSATION

[75] Inventors: Jurgen Gut; Ernst Spreitzhofer, both of Nubdorf, Germany

[73] Assignee: Bodenseewerk Perkin-Elmer & Co., GmbH, Uberlingen, Bodensee, Germany

[22] Filed: Dec. 21, 1971

[21] Appl. No.: 210,563

Related U.S. Application Data

[63] Continuation of Ser. No. 882,117, Dec. 4, 1969.

[52] U.S. Cl. .................... 340/347 AD, 340/347 CC

[51] Int. Cl. .......................................... H03k 13/02

[58] Field of Search ...................... 340/347; 73/23.1; 235/151.35

[56] References Cited

UNITED STATES PATENTS

| | | | |
|---|---|---|---|
| 3,177,482 | 4/1965 | Chase | 340/347 |
| 3,132,338 | 5/1964 | Schmid | 340/347 |
| 3,491,295 | 1/1970 | Van Saun | 340/347 |
| 3,274,586 | 9/1966 | Lapinski | 340/347 |
| 3,316,751 | 5/1967 | Burk | 73/23.1 |
| 3,027,079 | 3/1962 | Fletcher et al. | 340/347 |

*Primary Examiner*—Charles D. Miller
*Attorney*—Edward R. Hyde, Jr.

[57] ABSTRACT

An electronic counter operates as an integrating element and storage cell. Means are provided for applying a pulse sequence to the counter during the occurence of a residual or baseline signal prior to or between the peaks and a digital-to-analog converter circuit is coupled to and controlled by individual counter stages of the counter for generating analog signals in correspondence with the states and weights of the counter stages for forming the said correction signal. The circuit arrangement according to the present invention, on the one hand offers the advantages of the "digital" zero line compensation with respect to accuracy and storage capacity while on the other hand avoids the use of moving parts as the stepping motor.

1 Claim, 3 Drawing Figures

INVENTORS
JURGEN GUT
ERNST SPREITZHOFER
BY
ATTORNEY

INVENTORS
JURGEN GUT
ERNST SPREITZHOFER
BY
ATTORNEY

CIRCUIT ARRANGEMENT FOR BASELINE COMPENSATION

This is a continuation, of application Ser. No. 882,117, filed Dec. 4, 1969.

This invention relates to integrating circuit arrangements for indicating the area under peak components of an electrical waveform. The invention relates more particularly to an improved form of baseline correction arrangement for use with integrators.

Various analytical instruments provide output information in the form of an electrical signal having a waveform including peak and baseline components. In a gas chromatograph for example, the area under each peak component is representative of the concentration of an associated sample component. Known integrating arrangements have provided an indication of the area under the peak components and thus are useful in conserving labor and time in analysis of the output signal.

For various reasons, the baseline component of the signal waveform varies in amplitude over an interval of time. The peaks extend from this varying baseline and a peak indication provided by the integrator is thus subject to error. It is desirable to reduce baseline variations in order to improve accuracy of indication.

Automatic baseline correction has been performed in a prior art arrangement and the baseline component has been substantially reduced to zero by circuit means which apply a correction signal to the input terminals of the integrator at a time intermediate the occurrence of the signal peaks, while, during the occurrence of the peaks, the correction information is stored and retained. In an integrator of this type, the analytical instrument output signal amplitude is converted to pulses having a frequency proportional to the amplitude of this signal by a voltage-to-frequency converter. The pulse frequency is then applied to a counter which forms the integral. Intermediate the occurrence of the signal peaks, a baseline correction signal is derived from a potentiometer and is applied to input terminals of the counter and superimposed on the input signal. The output frequency of the voltage-to-frequency counter is then reduced to zero between the occurrence of peaks. In particular, a stepping motor, which is controlled by the output of the counter, adjusts a potentiometer in accordance with the polarity of the baseline component. The stepping motor is rotated in one or another direction and in magnitude in accordance with the polarity and amplitude of the baseline component. Upon correction the stepping motor is switched off and the correction voltage is stored by virtue of the position of the potentiometer. During the occurrence of the next peak to be measured, the correction signal stored by the position of the potentiometer remains active. This prior art arrangement suffers from the shortcoming that mechanically moved parts are required and compensation is effected relatively slowly.

In another known arrangement disclosed in U.S. Pat. No. 3,221,628, the zero line drift of an ionization detector is corrected by storing the detector output in a capacitor shortly prior to the measurement of each peak. The capacitor is coupled to a signal amplifier of the ionization detector during the actual measurement. The stored capacitor voltage compensates the proportion of the detector signal corresponding to the zero line drift. However, this arrangement operates relatively inaccurately, as leakage currents and the load on the capacitor will falsify the corrective effect.

It is an object of the present invention to provide an improved circuit arrangement for baseline compensation.

Another object of the invention is to provide a circuit arrangement for baseline compensation which provides a relatively rapid and accurate zero line compensation.

It is a still further object of the present invention to provide a circuit arrangement for baseline compensation which provides for storing the correction signal over a relatively longer period of time than prior arrangements.

In accordance with the general features of the present invention, an electronic counter operates as an integrating element and storage cell. Means are provided for applying a pulse sequence to the counter during the occurrence of a residual or baseline signal prior to or between the peaks and a digital-to-analog converter circuit is coupled to and controlled by individual counter stages of the counter for generating analog signals in correspondence with the states and weights of the counter stages for forming the said correction signal. The circuit arrangement according to the present invention, on the one hand offers the advantages of the "digital" zero line compensation with respect to accuracy and storage capacity while on the other hand avoids the use of moving parts as the stepping motor disclosed in the German Patent specification No. 1,263,179. Moreover, it is unnecessary to derive a signal from a potentiometer, thereby avoiding problems relating to the accuracy of this pickoff, the contact resistance, etc. The zero line compensation may be accomplished very quickly. On the other hand, the digital operation ensures that there will be no control hunting.

The features of the invention can be realized with alternative embodiments. In one embodiment a bidirectional counter having two inputs is provided and a pulse generator is coupled to the forward and the backward counting input terminals of the counter through two AND gates. During zero line compensation, either one of the gates is enabled in accordance with the polarity of the residual signal, or each gate is disabled in the absence of residual signals. An integrating element as for example a Miller-integrator circuit is connected between the input and the output. When the residual signal has an amplitude of different polarity, a constant signal for counteracting the correction signal is additionally applied to the input. In the absence of a residual signal, a state of equilibrium exists and this additional signal is compensated for by a correction signal differing from zero. When then a residual signal of the one or the other polarity occurs, the counter will have applied thereto pulses across either the forward or the backward counting input terminals and will cause a change in the balanced correction signal in a one or the other direction in order to compensate the residual signal.

In an alternative embodiment, a counter of the forward-counting type only is employed and the polarity of the correction signal is reversible in accordance with the polarity of the residual signal across the output. The counter is then reset to zero at the beginning of each zero line compensation.

The digital-to-analog converter circuit in one arrangement comprises a plurality of resistors of different impedances which are connected in parallel by circuit means controlled by the counter stages.

These and other objects and features of the invention will become apparent with reference to the following specifications and drawings wherein.

Figure 1:
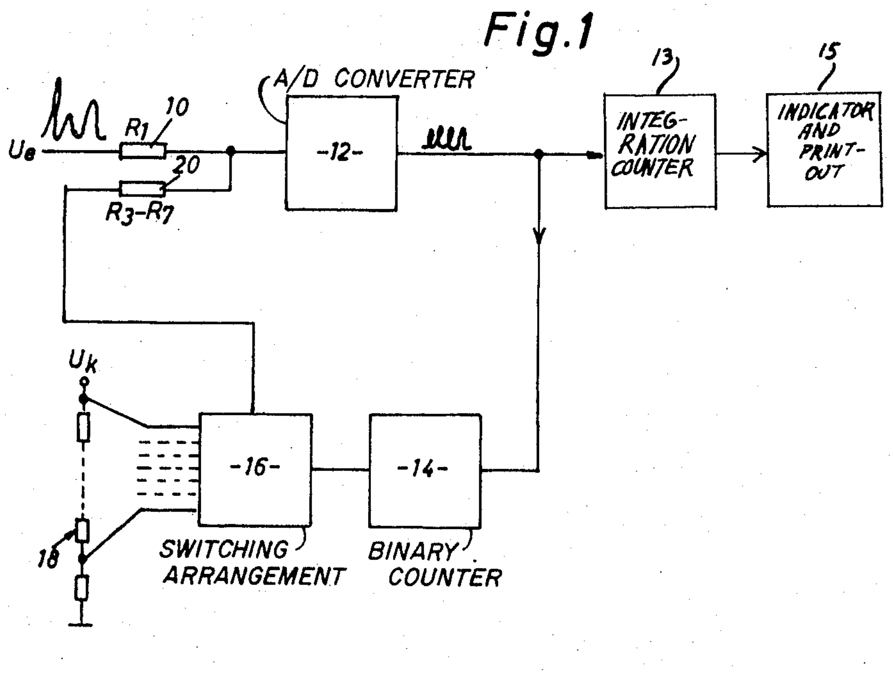
FIG. 1 is a block diagram of one embodiment of the invention.

Referring now to FIG. 1, an input voltage $U_e$ is supplied to an analog-to-digital converter 12 through a resistor 10. The signal $U_e$ includes a baseline component and peak components which are to be integrated. The input voltage may, for example, be the input signal of an ionization detector in a gas chromatograph. In such apparatus, the base line can drift over a period of time. This drift results in an error. The analog-to-digital converter comprises a summing amplifier which provides across its output terminals a pulse sequence. This sequence is coupled to a counter 13 for the purpose of integration. The counter indication is printed out by means of a printing device 15. The printout is indicative of the area below the peak of the input voltage $U_e$.

The output signal of converter 12 is additionally supplied to a binary bidirectional counter 14 in an interval of time between occurrences of the individual peaks to be measured, and at which time the amplitude of the input signal $U_e$ should be zero. The counter 14 includes a plurality of individual stages which are coupled to and control a switching arrangement 16. A correction voltage $V_c$ corresponding to the states and weights of the individual counter stages is derived from a potentiometer 18 which is connected across an auxiliary voltage $U_k$. The correction voltage $V_c$ is applied to the input of the analog-to-digital convertor through a resistor 20 in addition to the input voltage $U_e$. As long as a residual signal exists in the interval between the peaks to be measured, a pulse sequence will be generated across the output of the analog-to-digital converter 12. This pulse sequence is applied to the counter 14 and varies the amplitude of the correction voltage $V_c$ until the correction signal counterbalances the residual signal caused by the zero line drift at the input of the analog-to-digital converter. When the individual peaks occur and are being measured, the zero line compensation is switched off. The binary counter 14 and the switch arrangement 16 will then remain in their last state. Thus, the correction signal is stored digitally during the measurement and integration of the peaks.

In the arrangement according to FIG. 1, the output frequency of the analog-to-digital converter drops to zero as the correction signal according to its magnitude approximates the residual signal caused by the zero line drift. However the binary counter 14 and the switch arrangement 16 attain the final balanced state in relatively slow steps. In the arrangement according to FIG. 2, an input voltage $U_e$ with individual peaks, which should extend from a baseline component having zero amplitude between these peaks, is applied to the input of a Miller-integrator 24 through a resistor 22. The Miller-integrator comprises an operational amplifier 26 with a feedback through a capacitor 28. This Miller-integrator may simultaneously be used to integrate the input signals $U_e$ in time. Two polarity-dependent trigger circuits 30, 32 each supplying a signal across their outputs when a signal threshold value of the one or the other polarity is exceeded are coupled to the output of the Miller-integrator 24. The outputs of the two triggers connect to one input each of one AND gate 34 or 36, respectively. A second input of each of these AND gates connects to a signal line 38 to which a signal from a compensation signal on-off switching control signal source 39 is applied for switching the zero compensation on and off. The outputs of the AND gates 34 and 36 connect to one input each of one AND gate 40 or 42. To the second inputs of the AND gates 42 and 40 pulse sequences are applied from a pulse generator 44 which supplies pulses of a fixed predetermined frequency. The outputs of the AND gates 40 or 42 are connected with the forward or backward inputs 46 and 48, respectively, of a counter 50. The counter 50 is designed as a binary bidirectional counter. The different counter stages of the counter 50 comprise bistable elements.

A correction signal auxiliary voltage $V_k$ is applied to the input of the operational amplifier 26 through one transistor each 52 to 60 and one resistor each 62 to 70 in series connection therewith. The transistors 52 to 60 are controlled by one counter stage each of the counter 50. They act as switches by which the resistor in series connection therewith is coupled between the counter stage and the input to amplifier 26. An incremental voltage $V_v$ for counteracting the correction signal is applied to the input of the operational amplifier 26 through a summing resistor 72.

Figure 2:
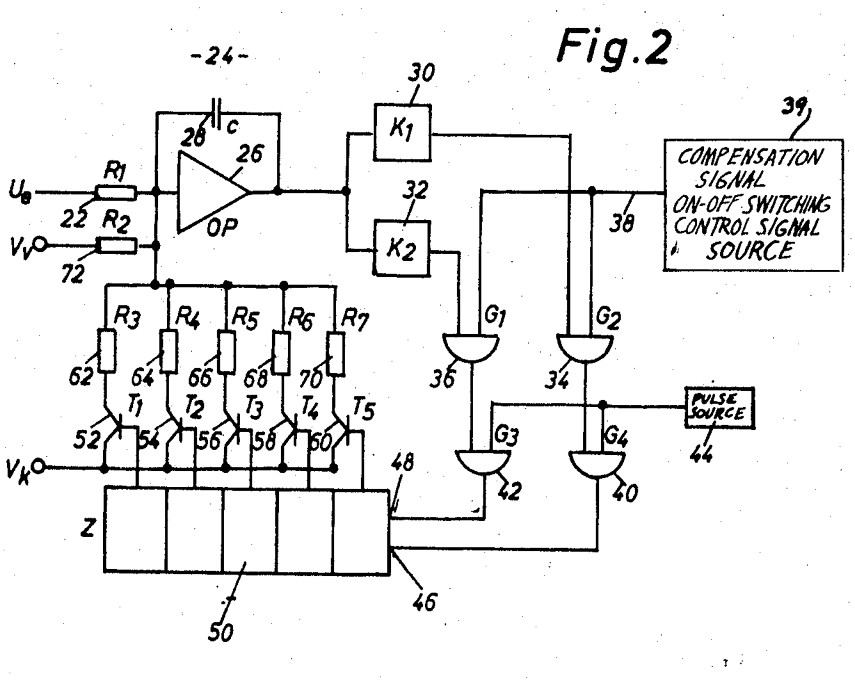
FIG. 2 illustrates another embodiment of the invention.

The operation of the baseline correction arrangement of FIG. 2 is explained as follows. During the interval of time between the occurrence of peaks to be measured in the input signal $U_e$, a signal is applied across the control line 33 from the source 39. If at this time the residual signal across the input of the Miller-integrator 24 has zero amplitude, the output signal of the Miller-integrator will correspond to a zero input and the trigger circuits 30 and 32 will supply a zero amplitude signal both across the one input of the AND gate 34 and also across the one input of the AND gate 36. Consequently, the AND gates 40 and 42 remain blocked. The counter is therefore not supplied with pulses. If, however, a residual signal does exist across the input of the Miller-integrator circuit 24 during this interval, the threshold value of either the trigger 30 or the trigger 32 will be exceeded, and one of these circuits will be triggered in accordance with the polarity of the signal. If, for example, the trigger circuit 30 is switched, then a signal is applied to the second input of the AND gate 34. Consequently, the AND gate 40 is enabled and a pulse sequence from the pulse generator 44 is applied to the forward input 46 of the counter 50 through the AND gate 40.

Each set binary stage of the counter 50 closes the switch connected thereto (transistor 52 to 60), and a current flows to the summing point at the input of the Miller-integrator 24 through a resistor 62, 64, 66, 68 or 70 having an impedance value selector to correspond to the magnitude of the digit represented by that stage. This compensating current acts as a correction signal and discharges the capacitor of the Miller-integrator. In a balanced state, it reaches a value equal to that of the input current caused by the residual voltage across the input. The polarity of these two currents is different. Then, in a balanced state the output of the Miller-integrator assumes a value between the threshold values of the trigger circuits 30 and 32. The gate 40 is then blocked and the compensation is completed. The state of the counter 50 and therewith the compensating current are maintained even though a peak to be integrated of the input voltage $U_e$ occurs across the input.

An incremental voltage $V_v$ is supplied through the resistor 72 to the converter. In the absence of a residual voltage from the detector signal, a signal will occur across the output of the Miller-integrator. This signal causes pulses from the pulse generator 44 to be applied to the counter 50. The counter then provides a counter reading different from zero, resulting in a compensating current flow in the resistors 62 to 70 which counterbalances the current through the resistor 72. Upon the occurrence of a residual voltage of positive or negative sign, a pulse sequence from the pulse generator 44 is applied to the forward or backward input 46 and 48, respectively, of the counter 50 through gate 40 or 42. The counter reading then varies from the balanced counter reading towards one or the other values until the residual voltage is compensated.

Figure 3:
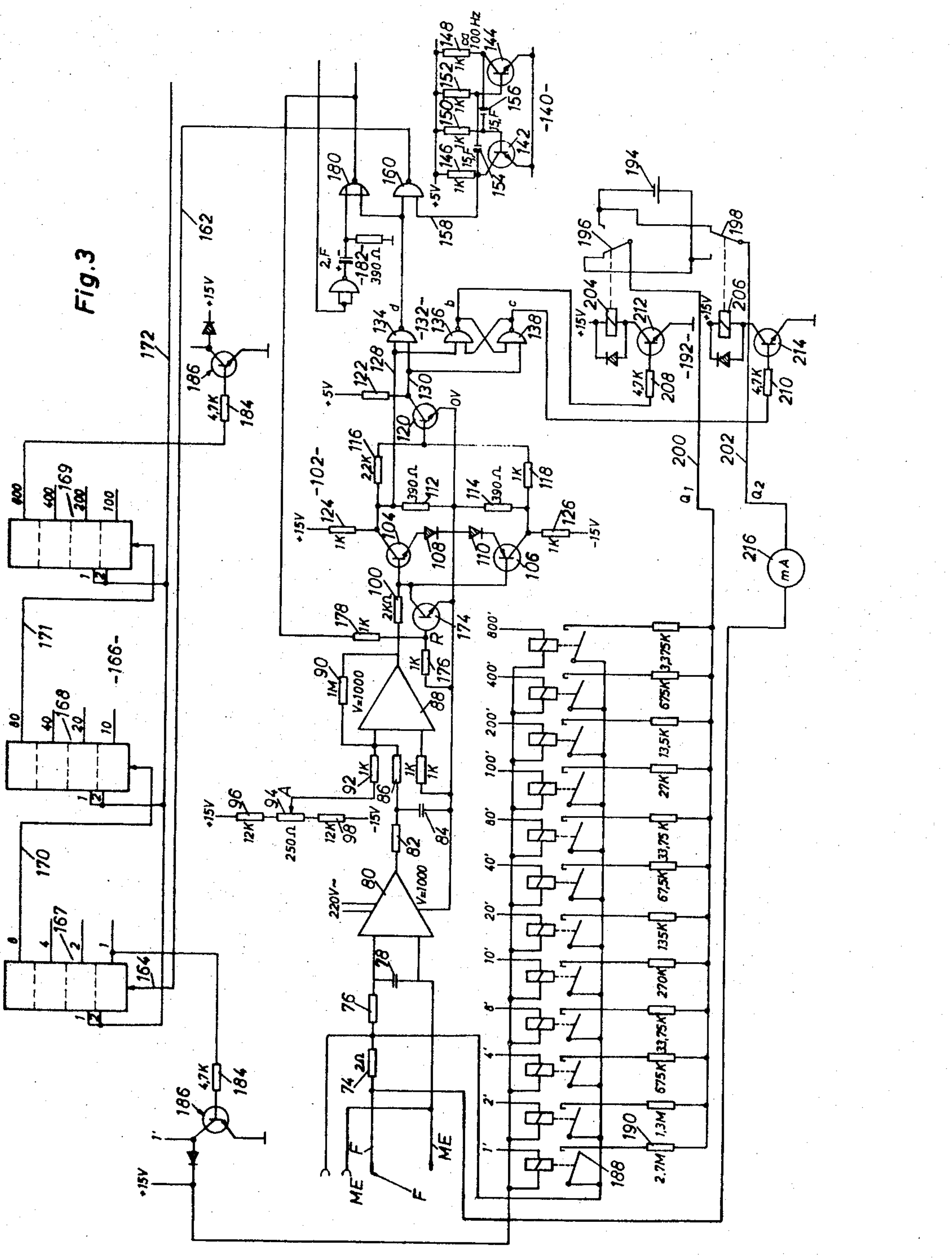
FIG. 3 is a schematic diagram of a third embodiment of the invention.

An alternative embodiment of the invention is illustrated in FIG. 3. An input signal for the baseline correction unit arrangement occurs between a signal line F and a measuring ground ME. This may, for instance, be the output signal of a flame ionization detector. This signal is applied to an amplifier 80 through a resistor 74 of 2 ohms and a filter element comprised of a resistor 76 and a capacitor 78. The signal thus amplified is applied to the input of an operational amplifier 88 through a filter element comprised of a resistor 82 and a capacitor 84, and through a resistor 86 of 1 kilohm. The operational amplifier is connected in feedback through a resistor 90 of 1 megohm and provides a gain V = 1000. An initial compensation of the amplifiers may be accomplished through a resistor 92 by means of a potentiometer 94 with which the resistors 96 and 92 are in series connection between a voltage of +15 volts and a voltage of −15 volts. The output of the amplifier 88 connects to a comparator circuit, generally referenced 102, through a resistor 100. The comparator circuit includes two complementary transistors 104 and 106, the emitters of which are biased with respect to the measuring ground by diodes 108 and 110. The output of the amplifier 88 connects to the bases of the transistors 104 and 106. Resistors 112 and 114 of equal magnitude are coupled in parallel with the transistors 104, 106 respectively and to the diodes 108 and 110. The collectors of the transistors 104 and 106 are connected with the base of a transistor 120 through resistors 116 and 118, respectively.

The resistor 116 has a value of 2.2 kilohms. The resistor 118 has a value of 1 kilohm. The transistor 120 connects to a supply voltage of +5 volts through a collector resistor 122. The transistors 104 and 106 connect to supply voltages of +15 volts and −15 volts, respectively, through collector resistors 124 and 126. The comparator circuit 102 has two outputs 128 and 130, and the output 128 is provided by the collector of the transistor 104, while the output 130 is provided by the collector of the transistor 120.

The outputs 128 and 130 of the comparator circuit connect to a logic circuit generally referenced 132. This logic circuit includes an AND gate 134 with inversion of the output, wherein the output shall be referenced *d*. The logic circuit 132 further includes a bistable flip-flop represented by two AND gates with inversion of the output 136 and 138, respectively, in FIG. 3. The inverted output of the one AND gate 136 is connected with the one input of the AND gate 138. Likewise, the inverted output of the AND gate 138 connects to one input of the AND gate 136. The two other inputs of the AND gates 136 and 138 are connected with the outputs 128 and 130, respectively, of the comparator circuit. The bistable flip-flop 136, 138 supplies two output signals *b* and *c* which are complementary to each other.

Reference numeral 140 designates a self-oscillating multivibrator, comprised of transistors 142 and 144, the collectors of which connect to a supply voltage of 5 volts through resistors 146 and 148, respectively, and the bases of which connect to the said supply voltage through resistors 150 and 152, respectively. The collector of the transistor 142 is connected with the base of the transistor 144 through a capacitor 154, and the collector of the transistor 144 is connected with the base of the transistor 142 through a capacitor 156.

This multivibrator circuit is designed for supplying a pulse sequence of a frequency of approximately 100 cycles. This pulse frequency is applied to the input of an AND gate 160 through a line 158. The other input of the AND gate 160 has connected thereto the output *d* of the AND gate 134 with inversion. As long as the output *d* = L, pulses from the self-oscillating multivibrator 140 will be applied to the input 164 of a counter generally referenced 166, via the line 162. The counter operates in the binary encoded decimal system and includes three counter decades 167, 168 and 169. Each of the counter decades is a binary counter having four flip-flops to which are assigned the numerical weights of 1, 2, 4 and 8 in the decade 167, or 10, 20, 40 and 80 in the decade 168, and 100, 200, 400 and 800 in the decade 169. The tens carry-over is effected via lines 170 and 171. The counter may be reset to zero through a line 172.

In parallel connection to the input of the comparator circuit 102 is a transistor 174 or equivalent circuit element as for example a relay. This transistor normally short-circuits the input of the comparator circuit so that the latter does not become effective and moreover, no pulses are counted into the counter 166. The base of the transistor 174 connects to the measuring ground ME through a resistor 176. Besides, the base of the transistor 174 is connected with the inverted output of an OR gate with inversion of the output 180 through a resistor 178. To the second inputs of the OR gate180 the output *d* of the AND gate with inversion of the output 134, on the one hand, and the output of a monostable flip-flop 182, on the other hand are connected. The OR gate 180 inverts the output, that means the output is L, if no L-signal is applied across any of the inputs. The L signal in the illustrated arrangement corresponds to a voltage of +5 volts. In normal condition, thus during measurement, *d* = zero and the monostable flip-flop 182 is not energized. Consequently, a positive voltage is applied across the base of the transistor 174. The transistor conducts and short-circuits the input of the comparator circuit. To initiate the zero compensation, the monostable flip-flop 182 is pulsed. The OR gate 180 has applied thereto an L signal to an input thereof for a defined period of time. The inverted output becomes zero and the transistor 174 blocks. If the comparison in the comparator circuit 102 shows that a residual signal is present, the output *d* will become equal to L, as will be described hereinafter. As long as such a residual signal is present, and consequently, an L signal occurs across the output $d$, the transistor 174 will remain blocked through the OR gate 180. Therefore, zero compensation is continued until the residual signal has disappeared. Then, the output of the OR gate with inversion of the output 180 assumes + 5 volts again, and the transistor 174 is made conducting. The input of the comparator circuit 102 is short-circuited. No pulses from the pulse generator 140 will be counted into the counter 166 any more.

Amplifiers 186 are energized by the individual counter stages and the individual bistable flip-flops of the different decades through resistors 184. Through these amplifiers 186 of which twelve are provided according to the number of bistable flip-flops in the counter 166, Reed-contacts 188 are actuated. To each bistable flip-flop in the counter 166 a resistor 190 is associated in accordance with its weight. The resistors 190 may be connected into a circuit parallelly to each other through the Reed-contacts 188, which circuit includes a pole-changeable voltage source generally referenced 192 as well as the 3 ohm resistor 74 in the measuring circuit. Through the resistors 190 currents are passed through the resistor 74, whereby a voltage drops across the resistor 74, proportional to the currents flowing through the different connected resistors. The resistor 74 is small relative to the resistors 190. If the currents are made to correspond to the weights of the individual bistable flip-flops in the counter 166, controlling the Reed-contacts 188, to be achieved by a suitable dimensioning of the resistors 190, then, the voltage drop across the resistor 74 will be proportional to the sum of the currents through the connected resistors and therewith analogous to the counter reading of the counter 166. Therefore, this arrangement constitutes a digital-to-analog converter.

The pole-changeable voltage source 192 includes a mercury cell 194. This mercury cell may be connected to outputs 200 and 202 with the one or the other polarity thereof through relay contacts 196 and 198 which are actuated in opposite sense. The relay contacts 196 and 198 are actuated by relays 204 and 206 which are energized by the two outputs $b$ and $c$ of the bistable flip-flop 136, 138 through resistors 208 and 210 and transistors 212, 214. Each state of the bistable flip-flop 136, 138 therefore has corresponding thereto one polarity of the voltage from the mercury cell 194 applied across the outputs 200, 202. The circuit of the current source 192 has further connected therein an indicating instrument 216 by which the correction signal may be indicated.

The arrangement as hereinbefore described operates as follows: Prior to the occurrence of a peak across the signal line F or between two such peaks a pulse is supplied to the monostable flip-flop 182, whereby the transistor 174 is blocked and the comparator circuit 102 is caused to become effective. If the residual signal is below a threshold value defined by the diodes 108 and 110, the two transistors 104 and 106 of the comparator circuit 102 will remain blocked. Due to the dissymmetry of the resistors 116 and 118 a negative voltage is also applied across the base of the transistor 120 so that also the latter remains blocked. In this case, an L-signal in the form of a voltage of +5 volts is present at the output 128 of the comparator circuit 102. L-signal is also present at the output 130 as the transistor 120 is blocked. The inverted output of the AND gate 134 is $d = 0$.

If the residual signal has a positive value which exceeds the threshold value given by the diode 108, the transistor 104 will become conducting. The output 128 of the comparator circuit 102 assumes zero. The voltage, however, across the base of the transistor 120 becomes more strongly negative, so that the transistor 102 remains blocked. Therefore in this condition, the state across the output 128 is 0 and the state across the output 130 is L. The bistable flip-flop 136, 138 then assumes a state where $b$ becomes equal to L and $c$ becomes equal to zero. Consequently, the relay 204 will pull on, the relay 206 will go off. The mercury cell 194 will be connected with the polarity shown in FIG. 3.

Since the output 128 of the comparator circuit 102 is zero, the inverted output of the AND gate 134 becomes $d = L$. This has two effects: Through the OR gate 180 with inversion of the output, the L signal is supplied to the base of the transistor 174 as zero volt (inverted). Thus, the transistor 174 remains blocked, even though the monostable flip-flop 182 returns into its initial position. Furthermore, the gate 160 is opened, whereby the pulse generator or self-vibrating multivibrator may supply pulses to the counter 166 through the line 162. Thereby a correction signal in the form of a voltage drop across the resistor 74 is supplied into the measuring circuit through the Reed-contacts 188 and the resistors 190. The magnitude of the correction signal depends on the counter reading and is proportional to the latter. The polarity depends on the position of the contacts 196, 198 and is selected so that the correction signal counteracts the zero drift or the residual signal in the measuring circuit.

If the residual signal is negative, the transistor 104 will be blocked, the transistor 106 becomes conducting. Thereby, the voltage across the base of the transistor 120 is shifted towards the positive. The transistor 120 becomes conducting. In this state an L signal of +5 volts occurs across the output 128 of the comparator circuit 102 and a zero signal of zero volt across the output 130. The inverted output of the AND gate with inversion 134 becomes $d = L$ again. Thereby, the relay contacts 196 and 198 are changed, therefore, the mercury cell 194 is reversed in its polarity. Now, through the resistors 198 a current is passed again through the resistor 74, the intensity of which is proportional to the counter reading, the polarity of which is reversed and counteracts the residual signal.

When effecting the zero compensation, the signal $d$ across the output of the AND gate 134 returns to zero. Thereby, the counting of pulses from the pulse generator 140 into the counter 166 is interrupted. At the same time, the comparator circuit 102 is again rendered ineffective through the OR gate 180 and the transistor 174. Now, measurement may be effected, the bistable flip-flop 136, 138 remaining in its last state and maintaining the required polarity of the voltage from the voltage source 182.

Also, the correction signal is maintained, since this correction signal is stored by the counter 166 and is converted into a corresponding analog correction signal through the Reed-contacts 188 and the resistors 190.

Consequently, the following true table is obtained for the comparator circuit 102 and logic 132:

| Input | b | c | d | |
|---|---|---|---|---|
| + | 0 | L | L | during compensation positive |

| | | | | |
|---|---|---|---|---|
| | | | | zero line drift |
| 0 | 0 | L | 0 | position of rest positive after compensation |
| – | L | 0 | L | during compensation negative zero line drift |
| 0 | L | 0 | 0 | position of rest negative after compensation |
| L = –5 | volts | | 0 – 0.2 volts | |

Hence, the bistable flip-flop 136, 138 stores the polarity of the zero line drift for the duration of the actual measurement of the peaks, while the magnitude of the zero line drift is stored in the counter 166.

By the arrangement as hereinbefore described a high accuracy and stability is obtained. The storage capacity is not limited in time. Mechanically moved parts such as motors and potentiometers are omitted. As compared with prior art systems comprising storage potentiometers, the rate of compensation may be substantially increased.

The description of FIG. 3 includes exemplary circuit elements and is not deemed limiting in any respect.

What is claimed is:

1. In a circuit arrangement for converting an electrical analogue input signal to an output signal, said input signal having peak components extending from a baseline component that is subject to variation in amplitude, an improved baseline correction arrangement comprising:

An analogue-to-digital converter circuit for converting said input signal to digital pulses, the number of which correspond to variations in the amplitude of said input signal;

a digital counter circuit having a plurality of stages for providing a plurality of digital output counts;

a digital-to-analogue converter circuit coupled to said counter for converting said digital output counts to an analogue correction signal corresponding to said baseline component amplitude;

means for applying said correction signal to said analogue-to-digital converter to cancel said variations in amplitude of said baseline component of said input signal, said arrangement incorporating:

a comparator circuit;

means applying said baseline component signal to said comparator circuit;

said comparator circuit providing an output signal when (a) said baseline component signal decreases and falls below a predetermined threshold value of one polarity, and (b) increases and exceeds a predetermined threshold value of an opposite polarity by being coupled to a bistable circuit having complementary outputs so that said bistable circuit exhibits one output when said baseline component signal increases and a complementary output when said baseline component signal decreases;

reversible switching means for applying said correction signal to said analogue-to-digital converter and means for coupling said complementary outputs of said bistable circuit to actuate said switching means to determine the polarity of the correction signal that is applied to said analogue-to-digital converter;

a coincidence gate;

means for applying said output of said comparator circuit to an input of said coincidence gate, a pulse generator coupled to another input of said coincidence gate, means for coupling said coincidence gate to said digital counter circuit so that pulses from said pulse generator are applied to said digital counter circuit when said coincidence gate is activated;

the output of said comparator circuit being adapted to be short circuited by means of a transistor switch during the occurrence of said peak components in said input signal to maintain said correction signal invariant during the occurrence of said peak components, said transistor switch being de-activated by a monostable flip-flop at the end of each peak component in said input signal and activated at the beginning of each peak component in said input signal; and said digital-to-analogue converter circuit including a plurality of resistors of different impedance values and a plurality of other switching means for coupling selected ones of said resistors in parallel between said counter and said converter means under the control of said counter stages so as to provide different analogue correction signals to said converter means depending upon the count in said digital counter.

* * * * *